United States Patent [19]

Vandenberg

[11] 4,365,616

[45] Dec. 28, 1982

[54] SELF-ALIGNING SOLAR COLLECTOR

[76] Inventor: Leonard B. Vandenberg, 710 Sanders Ave., Scotia, N.Y. 12302

[21] Appl. No.: 187,555

[22] Filed: Sep. 15, 1980

[51] Int. Cl.³ ............................................. F24J 3/02
[52] U.S. Cl. .................................... 126/424; 126/438
[58] Field of Search .............. 126/438, 439, 440, 424, 126/425, 451; 353/3; 350/283, 292, 293, 288

[56] References Cited

U.S. PATENT DOCUMENTS

| | | | |
|---|---|---|---|
| 1,951,404 | 3/1934 | Goddard | 126/438 |
| 3,982,526 | 9/1976 | Barak | 126/425 |
| 4,044,752 | 8/1977 | Barak | 126/425 |
| 4,158,356 | 6/1979 | Wininger | 126/425 |

Primary Examiner—James C. Yeung
Attorney, Agent, or Firm—Robert J. Bird

[57] ABSTRACT

A self-aligning solar energy collector which maintains its attitude facing the sun during the sun's daily and seasonal changes. Tension cables hold the collector in position, and are positioned so as to be out of equilibrium when off-axis solar radiation heat one cable more than another.

Self-alignment is in both horizontal and vertical planes. Multiple collectors are also disclosed in a ganged or master-slave relationship.

9 Claims, 27 Drawing Figures

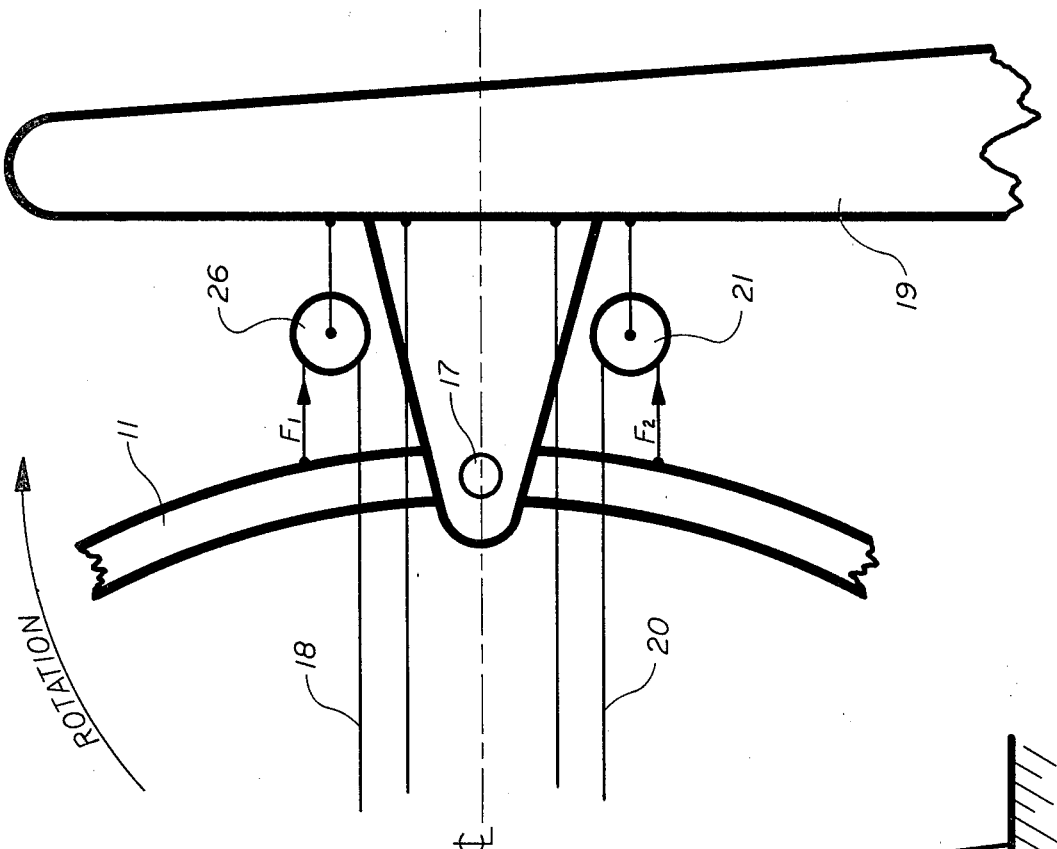
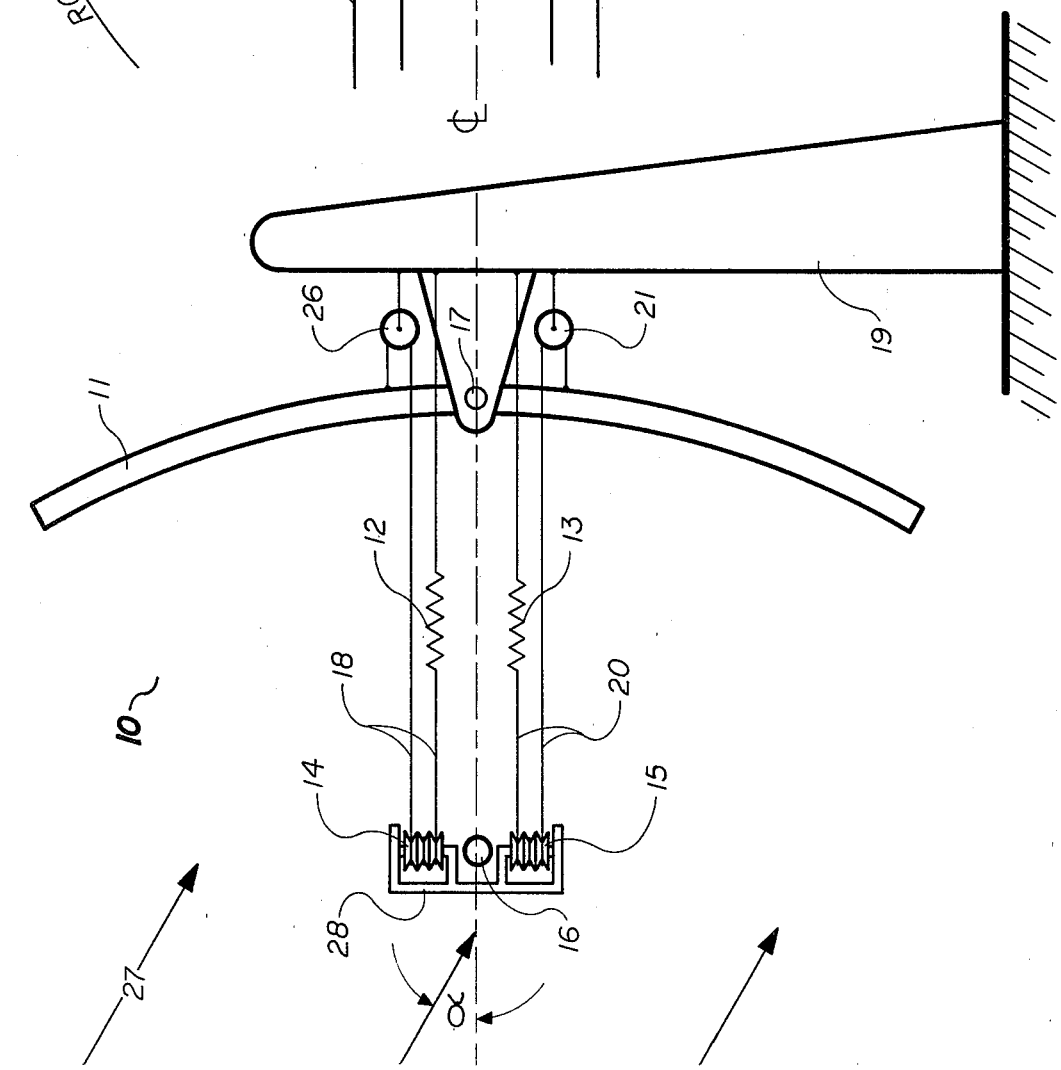

FIGURE 2
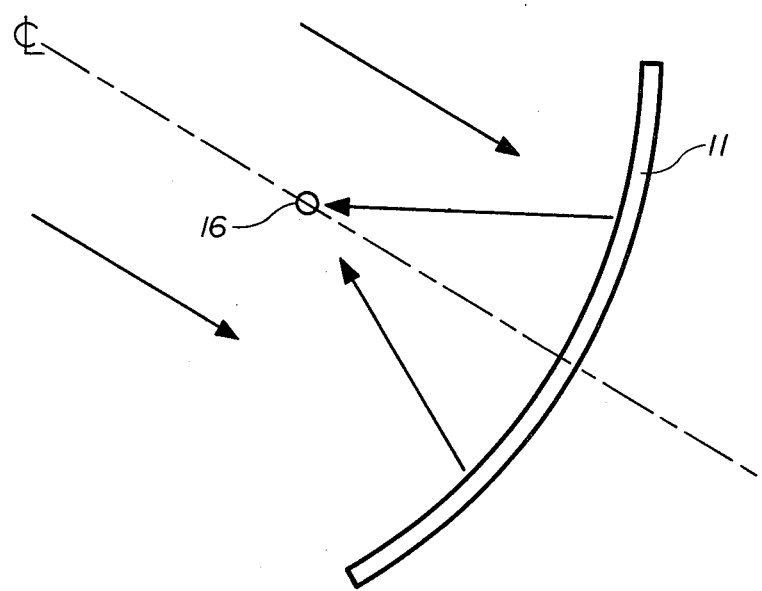
FIGURE 3
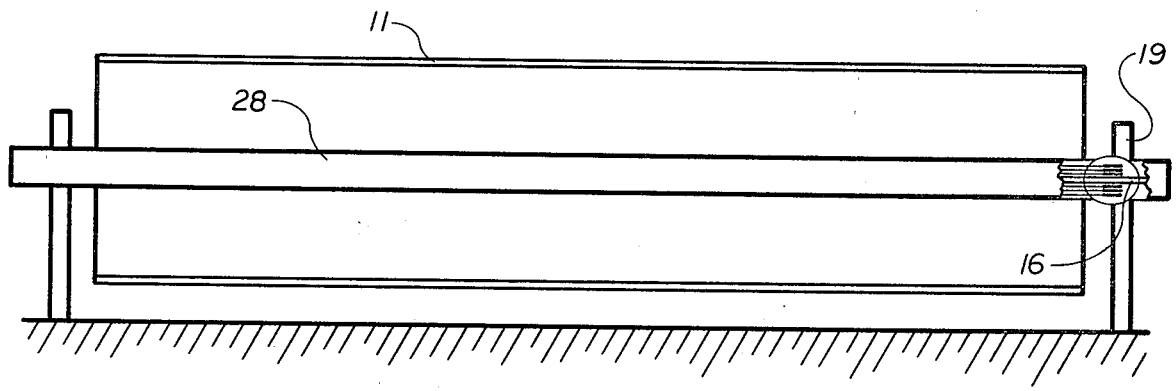
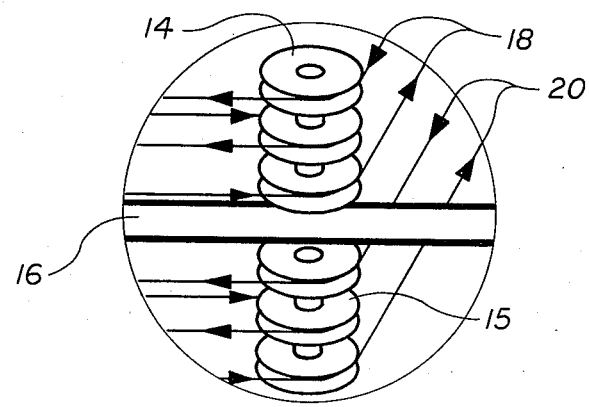

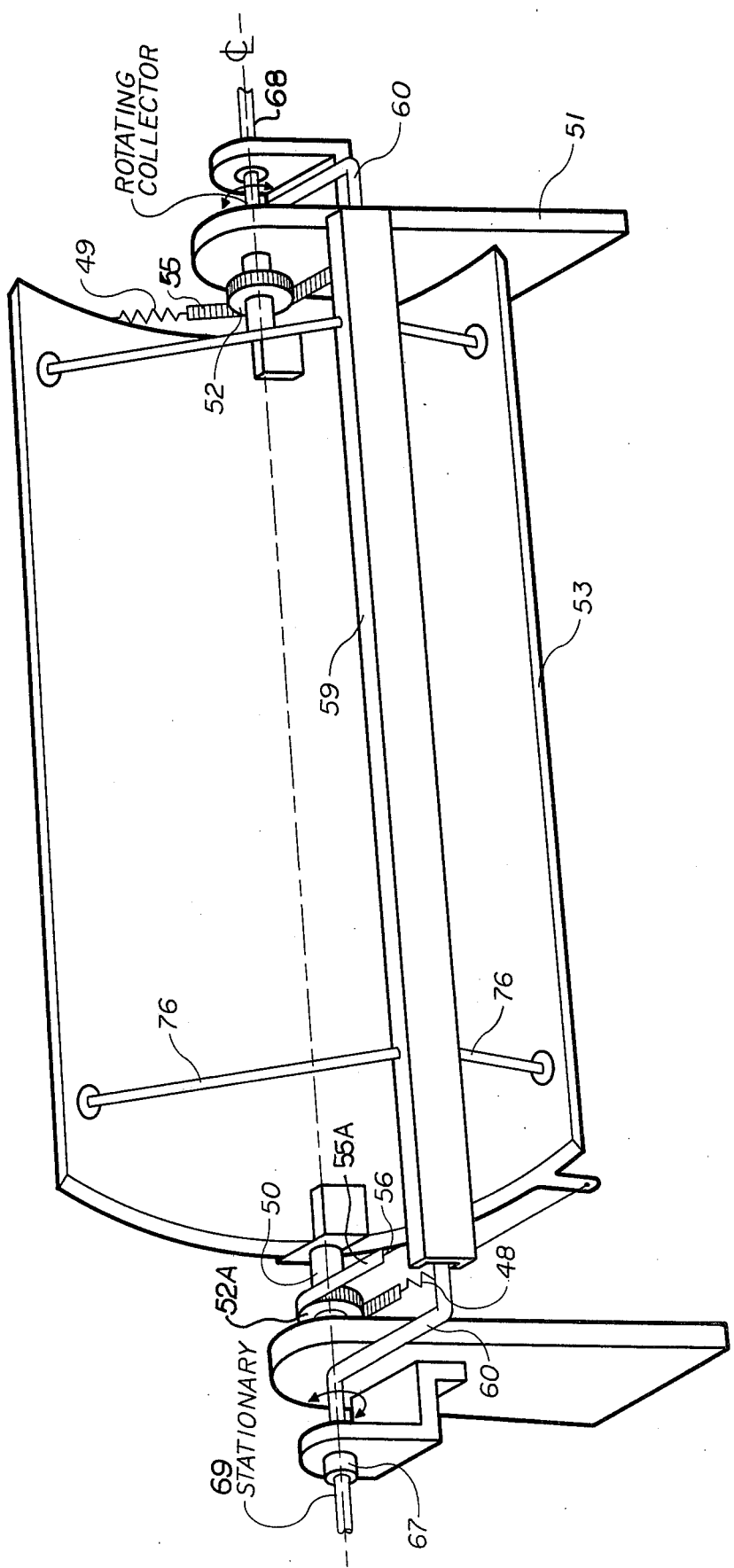

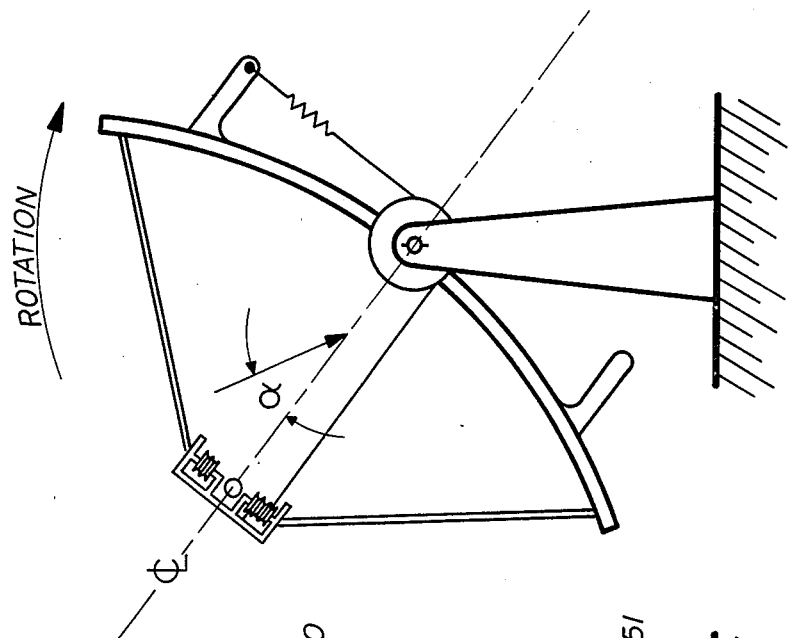
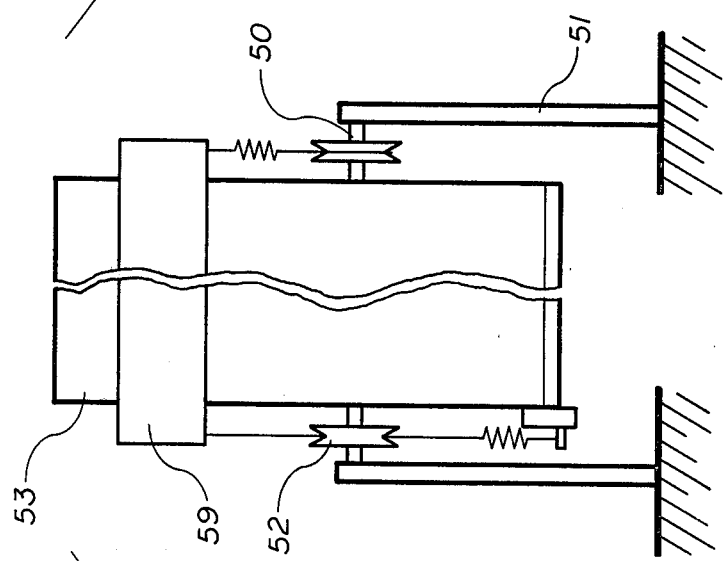
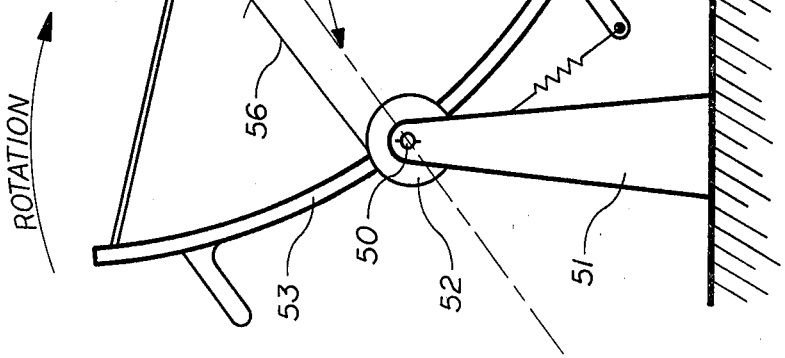

FIGURE 15
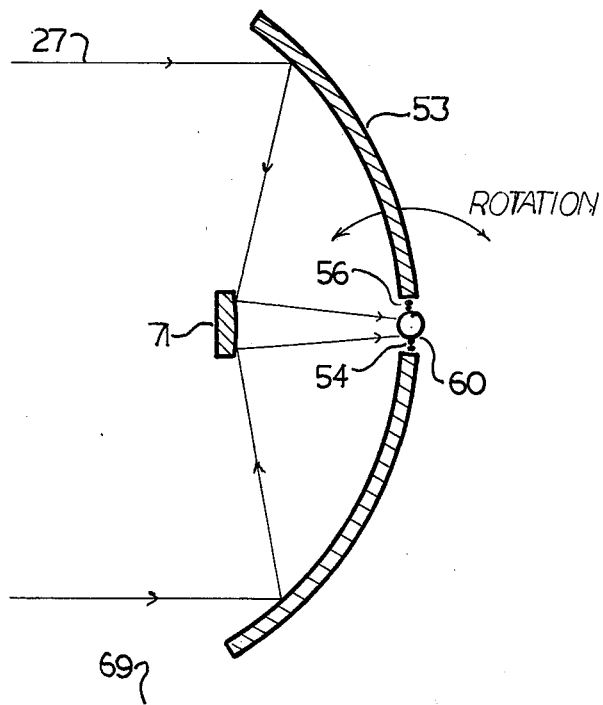
FIGURE 16
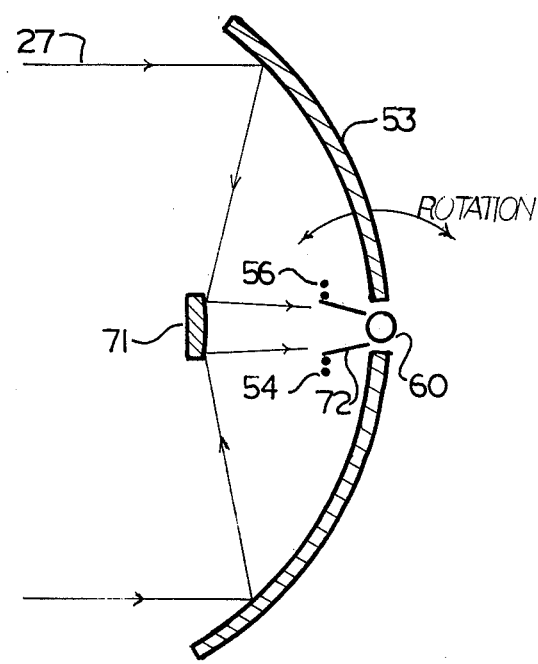
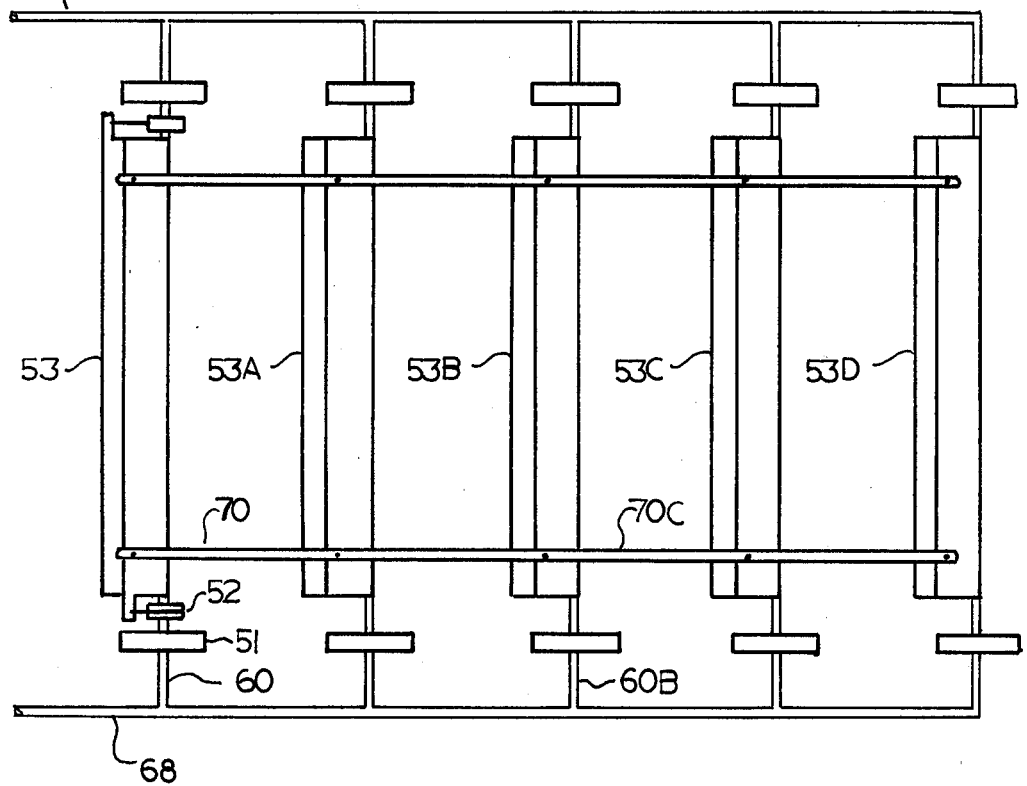
FIGURE 17

4,365,616

SELF-ALIGNING SOLAR COLLECTOR

BACKGROUND OF THE INVENTION

For cylindrical reflectors having a circular or modified parabolic profile, the concentration of direct solar radiation for achieving high temperatures is normally accomplished by control systems which line up the reflectors so as to focus the energy on a collector located along the line of focus of the associated reflector. Generally, the systems used for maintaining the proper alignment of the solar device as the sun's elevation changes have been complex and expensive. The overall efficiency of the collection of radiant energy from the sun is, among other things, governed by the amount of energy actually collected, compared with the energy and expense required for its collection. The stationary energy absorber is one which is generally positioned to receive maximum radiation at noon and is not provided with any scheme for tracking the sun. Hence, maximum solar energy collection is sacrificed to avoid the expense and energy of a tracking scheme. On the other hand, energy absorbers such as heliostatic devices which are provided with mechanical means for following the sun, usually are timed, motor-driven devices, and have increased solar collection capabilities, but are more expensive because of the tracking system. This increased expense of prior art tracking means is particularly prohibitive where small individual units are desirable, such as in underdeveloped countries or in household use, where a simple durable solar energy collection device is necessary.

In a publication entitled "Stationary Mirror Systems for Solar Collectors", by H. Tabor which appears in *Solar Energy*, Vol. 2, Nos. 3-4, July-October 1958, at pages 27-33, there is defined an angle in solar geometry called the East-West Vertical (EWV) altitude. This is the angular movement related to the rise and fall of the sun. It is both a daily and annual phenomenon; that is, it varies throughout the day and throughout the year. It is a function of both latitude and season. The correct position of a solar collector to account for the variations of EWV altitude is usually limited to variations in the seasonal tilt of the collector in accordance with seasonal changes in the declination angle for the sun. The EWV altitude, which is a relatively small, angular movement, is to be distinguished from the large angle the sun traverses over the course of a day as it sweeps the sky from sunrise to sunset. For purposes of designing a solar device, we consider that, at the equator on June 21, the sun is over the tropic of cancer which is about 24° north of the equator. Hence, the daily EWV angle is $90° + 24° = 114°$. This is about the maximum required angle on earth through which a solar collector device is required to operate.

In cylindrical radiant energy collectors, such as described in a publication by Roland Winston appearing in *Solar Energy*, Vol. 16, No. 2, at pages 89-95 and in his U.S. patent titled "Radiant Energy Collector", U.S. Pat. No. 4,002,499, the collector configuration is determined by the angle of acceptance. The concentration factor is roughly inversely proportional to this angle so that the greater the acceptance angle, the less the concentration, but the longer the period of collection for solar collectors. Therefore, if a collector could be provided with means which would allow a reduced angle of acceptance without a decrease in the period of collection, a higher concentration in a simplified design of the collector would be achieved. In U.S. Pat. No. 4,044,752, to A. Z. Barak, entitled "Solar Collector with Altitude Tracking", a device is described which provides for turning a solar collector about in an east-west horizontal axis so that the collector is tilted toward the sun as the EWV altitude of the sun varies each day. This invention only provides for a step change between two to three positions, and is not intended to track the sun as it sweeps the sky from sunrise to sunset, but only to tilt the collector in one of two or three discrete positions, towards the sun as the EWV altitude of the sun varies each day.

In U.S. Pat. No. 3,982,526, also to A. Z. Barak entitled "Turning Collectors for Solar Radiation", a device is provided for turning a solar collector about the polar axis so that the collector is directed towards the sun and sweeps from east to west as the sun tracks the sky each day. This patent provides no specific compensation for EWV altitude and only provides for the collector to turn between two stable states, that is, it does not provide continuous alignment of the collector with the sun. Also of interest is U.S. Pat. No. 3,213,285, issued to T. J. McCusker on a heliotropic orientation mechanism. That device employs bimetallic sensing strips or liquid capillary sensing means as thermomechanical positioning means. The device is intended for extraterrestrially located collectors and is incapable of supplying adequate forces for practical terrestrial use. Also, as a result of the support configuration between the collector and the bimetallic strips, the total deformation of the collector alignment mechanism is limited to perhaps 20° (see FIG. 2 of the patent).

None of these prior art devices provide for simple, durable collector alignment mechanisms capable of 180° of rotation (or at least 114° as explained above) and capable of tracking the sun continuously as it sweeps the sky and as it seasonally and daily changes its EWV altitude.

It is, therefore, an object of this invention to provide an improved solar collector alignment means.

A second object of this invention is to provide means for continuously varying the tilt of the solar collector around its horizontal axis in response to the daily and seasonal changes in the sun's EWV altitude.

A third object of this invention is to provide means for rotating the solar collector around its vertical axis so as to face the sun continuously during its sweep of the sky from sunrise to sunset.

It is a further object of this invention to provide a collector orientation device that corrects misalignment of the solar energy collector with no external power consumption.

SUMMARY OF THE INVENTION

Means are provided for turning a cylindrical type concentrating solar collector so that it fully faces the sun as the sun travels from east to west each day. The collector is pivotally mounted so as to permit simultaneous response to both EWV and east asimuth changes in the sun's position relative to the earth's horizon. Self alignment is accomplished without resorting to outside power means. The alignment of the collector is accomplished by the heating of a long wire held in tension by a spring. As the wire heats, it expands to change any equilibrium force condition that exists between it and a similar colder wire-spring system. The reflector is therefore rotated by the larger force until the forces are again in equilibrium. The action is similar whether the sun is above or below or to the right or the left of an imaginary line drawn from the center of the curved reflector surface to the center of curvature known as "the principal axis". The mechanism is of a size practical for home or commercial use, and it has a self-work capacity for continually supporting wind, weight, friction, and inertial loads while aligning both itself and connected "slave" assemblies.

DESCRIPTION OF THE DRAWINGS

FIG. 1 is a side view of a non-aligned collector.

FIG. 1A is a detailed view of the cable and pivot arrangement of FIG. 1.

FIG. 2 is a side view of an aligned collector.

FIG. 3 is a front view of a solar collector showing end detail.

FIG. 10 is a three-dimensional view of a motion-compensated collector design.

FIGS. 13A–13C depict the operation of the device of FIG. 12.

FIG. 15 is a side view of an alternate embodiment of the collector using a Cassagranian type optical system.

FIG. 16 is a modification of the FIG. 15 Cassagranian system which employs a concentrator.

FIG. 17 is a simplified drawing showing a self aligning reflector-collector assembly driving slave assemblies not equipped with the device.

DETAILED DESCRIPTION

Figure 4:
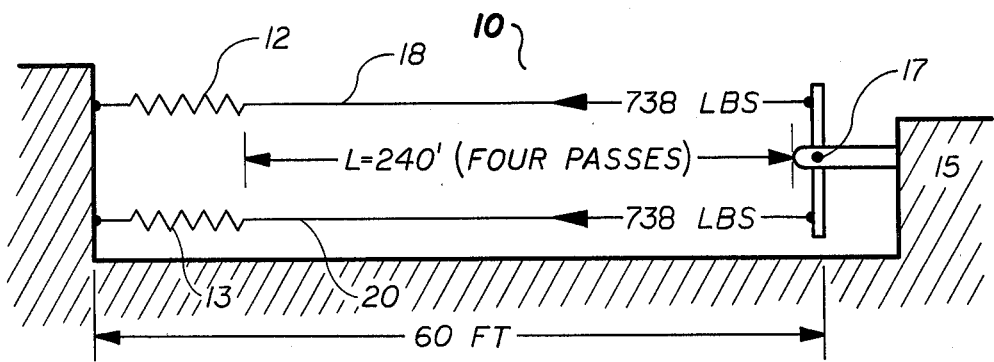
FIGS. 4 and 4A are simplified drawings for depicting the basic principle of the invention.

The basic principle governing alignment is best illustrated by referring to FIGS. 1, 1A, 2, and 3 which depict a non-motion compensating solar energy device generally indicated by reference numeral 10. The solar device is mounted on a stationary support 19 and pivots about an axis defined by pivot point 17. In the collector embodiment of FIG. 1 the solar device includes a cylindrical reflector member 11 that concentrates the solar energy at the collector 16, which may be a conduit through which flows a heat exchange fluid or water to be heated directly. It should be appreciated that other reflector configurations will serve equally well to concentrate the incident solar energy on the collector.

The alignment means includes an upper cable 18 positioned above the reflector pivot point and a lower cable 20 positioned below the pivot point. In order to hold the cables in tension, springs 12 and 13 are inserted at some convenient location in each cable, although it will be understood by those skilled in the art that any other tensioning means that would serve equally well may be used. One end of each cable is positioned rearwardly of the reflector 11 and secured to support 19. The tensioning means 12 and 13 are then inserted in the cable to insure the reflector will achieve an equilibrium position. The cables then pass over multiple-pass pulleys 14 and 15 situated in front of the reflector, and as shown in FIG. 3, to the extreme right thereof. Similar multiple-pass pulleys are situated at the left end of the reflector and the cables are passed between the pulleys and thereby traverse the face of the reflector several times. In the embodiment shown, four lengths of each cable traverse the reflector face. This number is only exemplary; the important thing is that sufficient cable is exposed to the heating effects of the reflector. The cables then pass around the right end and rearwardly of the reflector, then around pulleys 26 and 21, and are then attached to the back of the reflector shell 11. The pulleys 26 and 21 are secured to the stationary support 19 as best seen in FIG. 1.

FIG. 1 illustrates the embodiment of the invention where a cylindrical collector is used and the reflector is not aligned normal to the incident solar radiation as indicated by the arrows 27. The reflector must, therefore, be rotated clockwise around its horizontal axis, pivot 17, through an angle $\alpha$ in order for the collection system to be effective. It will be appreciated that continual adjustment, to allow for the changing elevation of the sun above the horizon, is necessary.

Restoration of the alignment from the non-aligned position of FIG. 1 to the aligned position of FIG. 2 results from the unequal heating of the long cables 18 and 20, which as indicated above, are always held in tension. From the situation depicted in FIG. 1, the lower cable heats and expands to change the equilibrium force condition then existing with the colder upper tensioned cable. The reflector will, therefore, be rotated clockwise by the larger force in the (colder) upper cable system until the reflector is again directed normally to the sun and equilibrium is restored. The action is similar if the sun is above or below the reflector axis.

Looking at FIG. 1A, when the cables are at the same temperature and the system is in equilibrium, the tension in cable 18, $F_1$, is the same as the tension in cable 20, $F_2$.

It is significant that the collector is self-aligning and requires no power or complicated mechanisms for this purpose.

Figure 4A:
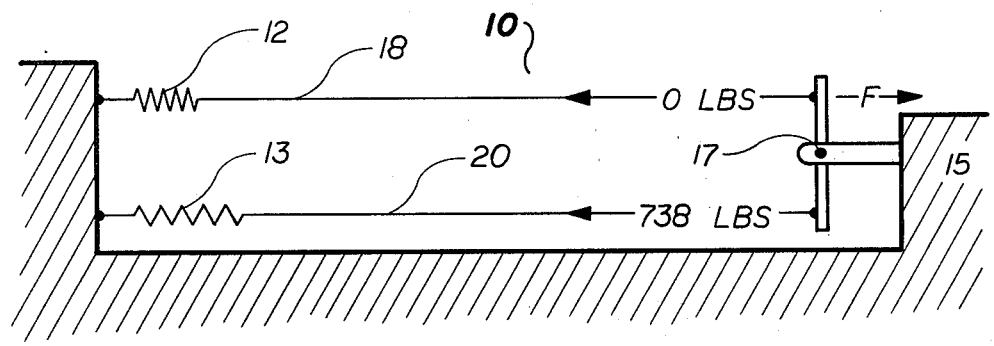

Turning now to FIGS. 4 and 4A, the principles used in this invention will be described by a simplified example. The work requirement arises from the need to rotate the reflector of some mass, through a displacement $\Delta S$, with a force F for overcoming the loads. The force F is provided by the thermal stress in a long member such as the cable of the subject invention. This force can be easily provided by a ⅛ inch diameter Inconel cable (available from International Nickel Co.) for normal household installations. For commercial use, cables having diameters greater than ⅛ inch should be used to supply the greater forces needed to operate the larger commercial devices.

FIG. 4 represents schematically an initial condition using a cylindrical reflector (not illustrated), 60 feet long, having an Inconel X-750, $\frac{1}{8}''$ diameter cable with four passes above and below the focal line. The solar rays are focused on the collector between the two sets of cables and each set has the same tensile stress and length (i.e., thermal equilibrium). The cables are loaded by the tensioning means (springs) to $\frac{2}{3}$ of the yield stress Sy.

Let:
S=length of cable (240')=2880 inches
E=mean temperature coefficient=$7.7 \times 10^{-6}$ in./in./°F.
$\Delta$S=change in cable length=in.
k=spring and cable stiffness=lbs/in.
Sy=yield stress of Inconel X−750=90,000 psi
F=tensile force in cables=lbs.
$\Delta$T=temperature difference between top & bottom cables, °F.
A=cable cross-sectional area=0.0123 in$^2$
Force in cables:
The design force shall be two-thirds of the yield stress.
$F = \frac{2}{3} \times Sy \times A$
$F = \frac{2}{3} \times 90,000 \times 0.0123$
F=738 lbs.
Cable Expansion:
Assume the upper cable in FIG. 4 is heated to a temperature 500° above the lower cable.
$\Delta S = S \times E \times \Delta T$
$\Delta S = 2880 \times 7.7 \times 10^{-6} \times 500$
$\Delta S = 11.1$ inches
Maximum Work Available for Restoring Alignment:
Assume misalignment causes the upper cable to heat to 500° F. above the lower cable and the rotation of the collector is opposed by an externally applied force F, in FIG. 4A (F represents wind, weight, friction and inertial forces that must be overcome to restore equilibrium).

Further select springs so that the combined stiffness of the spring and cable has a value of $K = F/\Delta S = 738$ lbs/11.1", or K=66.5 lbs/inches.

The thermal expansion of the top wire will relieve its tension force to zero. Hence, the externally applied cable loading F, caused by wind, gravity or friction, would have to be greater than 738 lbs. to prevent corrective rotation of the reflector.
$W = F/2 \times \Delta S$
$W = 738/2 \times 11.1$
W=4096 inch-lbs.
Of course, higher forces and work values can be produced with larger diameter cables.

Figure 5:
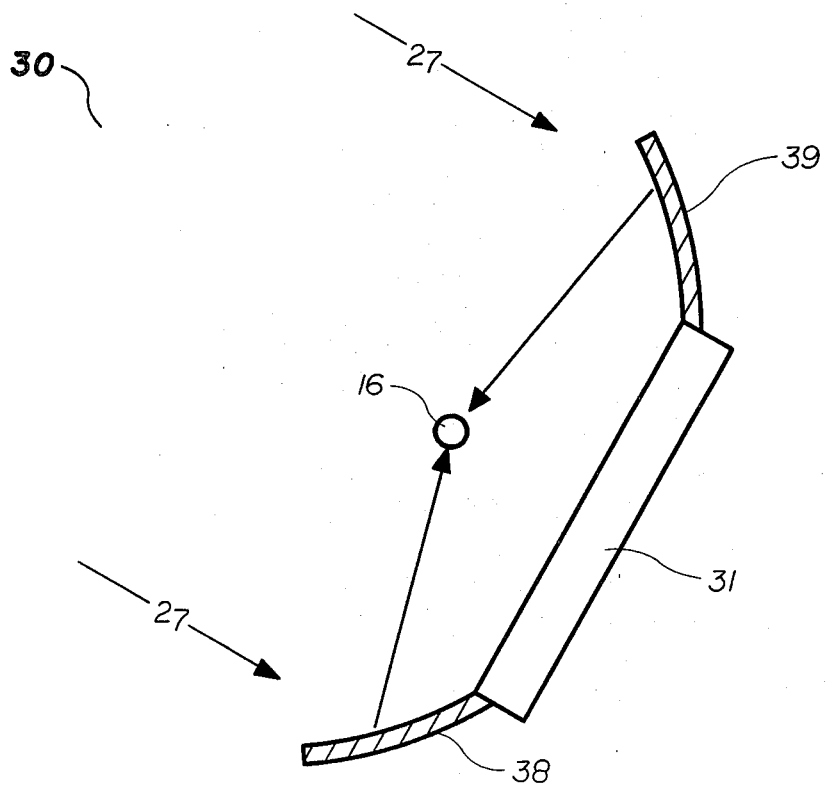
FIG. 5 is a side view of a solar "piggyback" flat plate solar collector.
Figure 6:
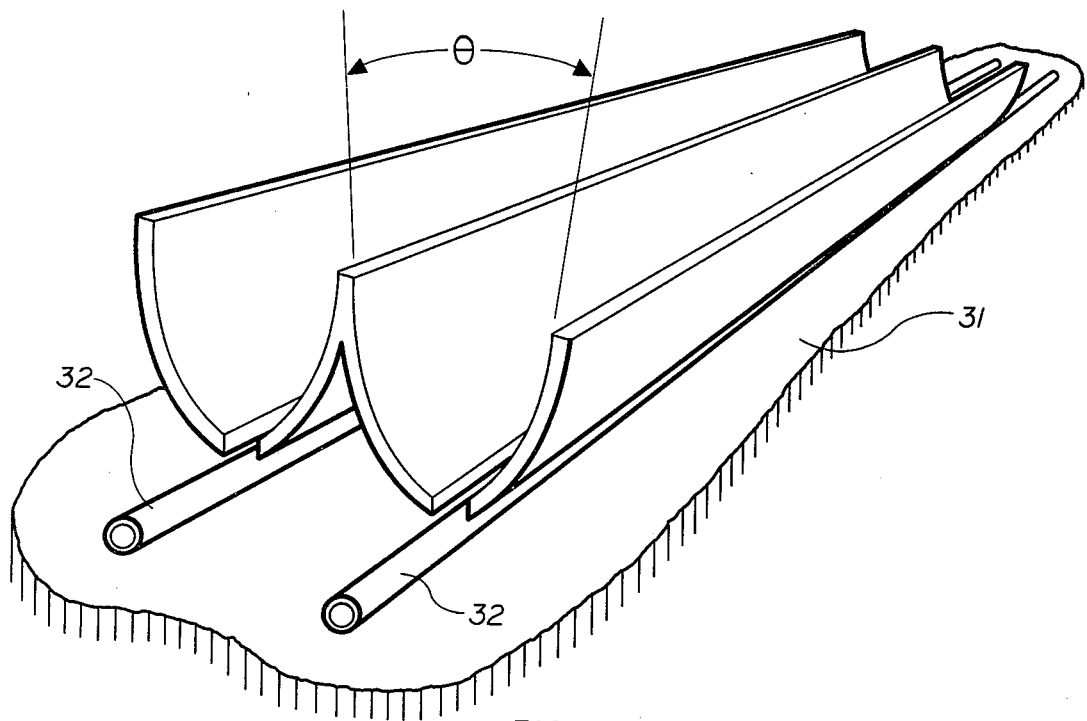
FIG. 6 is a three-dimensional view of two elements of the flat plate collector shown on FIG. 5.

Turning now to FIGS. 5 and 6, there is described an embodiment of the invention using a "piggyback" flat plate collector.

The novel, large restoring forces described above provide an opportunity to mount the invention on flat plate collectors. The flat plate collector will remain aligned normal to the sun's rays during intermittent cloudy periods and will therefore have optimum alignment for absorbing both direct and diffused solar energy.

Furthermore, as will be appreciated, flat plate collectors can be equipped with concentrator configurations having low acceptance angles ($\theta$) for concentrating the solar energy to a temperature greater than can be provided by a simple flat plate collector.

It should be appreciated that the maximum possible concentration for a given acceptance angle, shown as $\theta$ on FIG. 6, is $1/(\text{SIN } \theta/2)$. That is, as the acceptance angle $\theta$ decreases, the collector's ability to concentrate solar energy increases, but the collector must be "aimed" directly at the sun to realize this benefit, since it will only "accept" solar radiation in a very narrow angle.

The "piggyback" flat plate collector of FIG. 5 utilizes a cylindrical or parabolic reflector 38 and 39 to concentrate a fraction of the total incident energy on the assembly 30 to align it normal to the sun's rays as described above with reference to FIGS. 1 and 2. That is, reflectors 38 and 39 cooperate with a cable mechanism to align the system and the flat plate collector. 31, mounted with it, is also aligned at the same time to absorb the remaining direct radiation and, in addition, the diffused radiation.

This combination permits the use of a small acceptance angle configuration as shown in FIG. 6, on the flat plate collector, for concentrating both direct and diffused incident radiation on the flat plate collector tubes 32 to increase temperatures far above normal flat plate collector temperatures.

Figure 7:
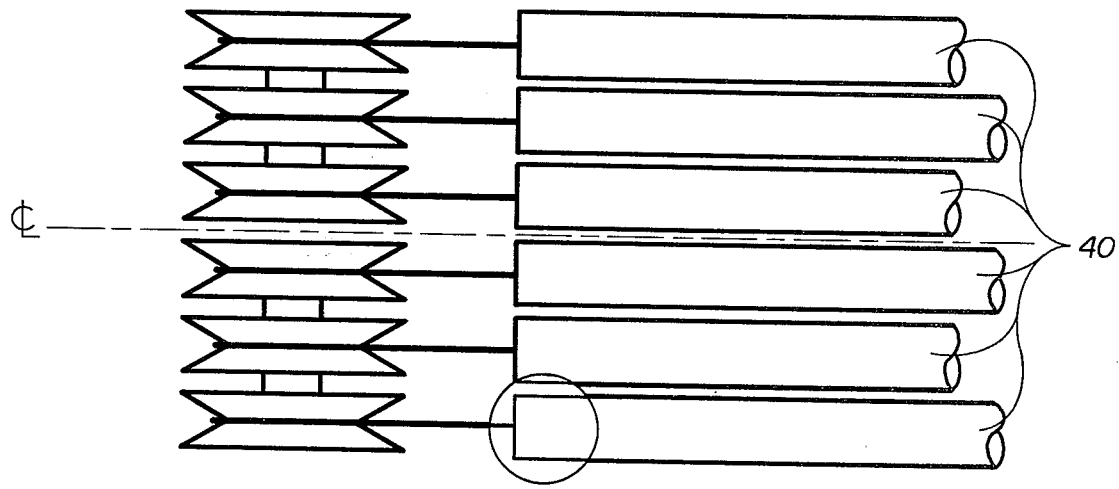
FIGS. 7 and 8 are an alternative embodiment of the solar device of FIG. 3.
Figure 8:
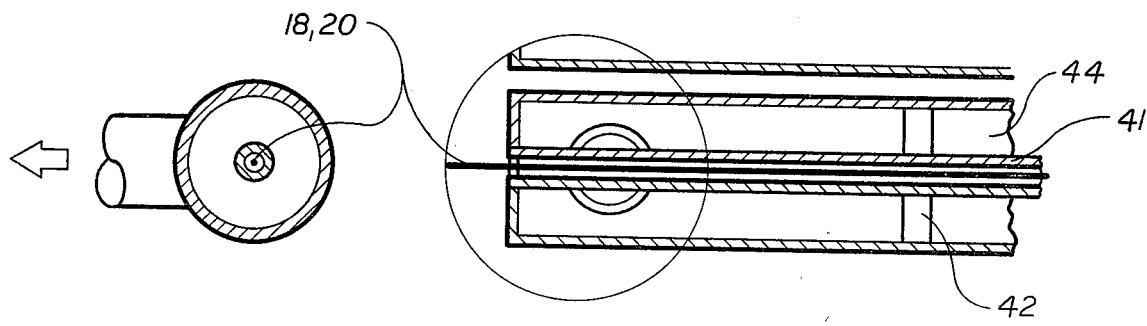

Turning to FIGS. 7 and 8, there is disclosed an alternate embodiment in which a multiple number of collector pipes 40 are used. A central smaller pipe 41 is contained inside each collector pipe 40 to provide space for a cable. The annulus between the two pipes contains the coolant for absorbing and transferring the collected heat. The annulus also contains a conventional thermostat 42 similar to those used in automotive cooling systems which opens to permit flow through the pipe when a preset temperature is reached.

As the demand for more and more heated cable is made, in order to restore alignment, the focal line of the reflector will be displaced from the center line ($\mathcal{L}$). The particular pipes being heated will increase in temperature and at a preset temperature will open the thermostats. However, the thermostats in the unheated collector pipes remain closed; hence, the coolant will only flow where needed to maximize collector coolant temperatures.

The internally located cable is protected from possible overheating since it cannot exceed coolant temperatures even though it is located on the focal line at one time or another.

The focal line of the reflector, therefore, may locate itself above or below the center line and heat the cable as required for focusing to collect the heat.

The multiple number of collector pipes used and the method for heating the cables precludes the need for precisely locating the cables. In this regard it should be generally noted that the required precision for locating the cables depends upon several factors, including the width of the band of focused radiation on the collector pipe or pipes. This, in turn, depends on the optical quality of the reflector surface, its shape, and the distance from the collector to the surface along the center line of the reflector. Assuming a high quality parabolic reflecting surface, the band on the collector will be sharply defined and in the interest of efficiency, the cables should be precisely located. To avoid overheating, the cables should be mounted inside a tube immediately adjacent to the collector similar to FIG. 9.

Figure 9:
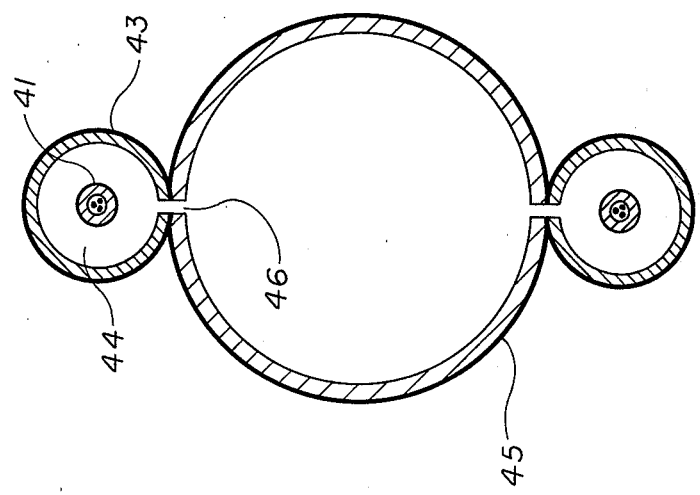
FIG. 9 is an alternative embodiment of the collector of FIG. 8.

In the embodiment of FIG. 9, there is disclosed control tubes 43 enclosing a small volume of fluid in the annular space 44 formed by tubes 41 and the control tube 43. Space 44 is connected at each end to the inside of the collector pipe 45 through orifice 46, so that only a small bleed flow passes through the control tube. The bleed flow surrounds the cable housing tube 41, which is open at its ends to air. This system will be sensitive to changes in the sun's elevation and also avoid overheating the cables located in side tube 41. Furthermore, it will provide thermal inertia to avoid hunting.

If the reflecting surface is of poor quality it may be necessary to increase the total width of the arrangement of collector and control tubes described above and illustrated in FIG. 9.

It may also be necessary to locate an additional length of cable nearer to the reflector so that it intercepts radiation during large changes in angle α. This cable would serve to initiate proper rotation of the reflector after a long cloudy period during which α has increased to such an extent that the radiation band is entirely above or below the control tubes.

As previously noted, the device described heretofore are non-compensating with respect to motion. Hence, collector 16, FIGS. 1 and 3 must have a large diameter or a collector system such as shown on FIG. 7 must be used in order to intercept the imperfectly focused radiation from the non-compensating collector.

It is desireable to minimize collector area in order to avoid excessive heat loss and improve collector efficiency. A motion compensated system will permit use of a narrow, sharply defined radiation band which will be stationary on a collector located on the principal focus of the reflector. Hence, a motion compensated design will permit use of a small diameter efficient collector.

Turning now to the embodiment of FIGS. 10-13, there is disclosed the applicant's motion compensated embodiment. FIG. 10 is a three-dimensional drawing showing collector tube 60 with its terminal at the axis or centerline ($\mathcal{C}$) of rotation of reflector 53. Connections to stationary pipes 68 and 69 are made at the axis by means of packed glands or rotating seals 67. The reflector supports the collector housing 59 by means of support members 76. The reflector, supports, collector housing and collector rotate as a unit around the shaft 50 which is held in a fixed position by support pedestal 51. A left end view of collector housing 59 is shown on FIG. 11, which depicts cable means 56 secured at one end to collector housing 59 and passing around the lower pulley of pulley assembly 57 and above collector 60 to a two pulley arrangement at the other end of housing 59 which is identical to pulley assembly 58 shown on FIG. 11. The final pass of cable 56 passes around the top pulley and is attached to sprocket belt 55A. Sprocket belt 55A engages sprocket 52A and connects to spring 48 which is attached to reflector 53. Cable 54 is similarly arranged except it passes back and forth below collector 60 and is connected as shown to the collector, sprocket belt, spring and reflector on the right side of FIG. 10.

Figure 11:
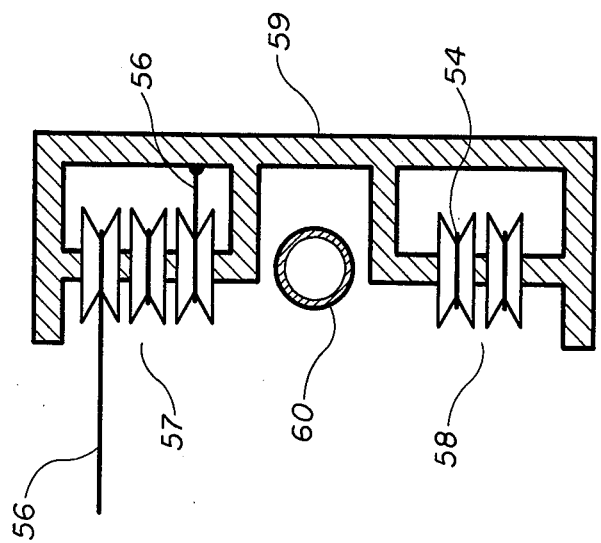
FIG. 11 is a detail of the cable connection of FIG. 10.
Figure 12:
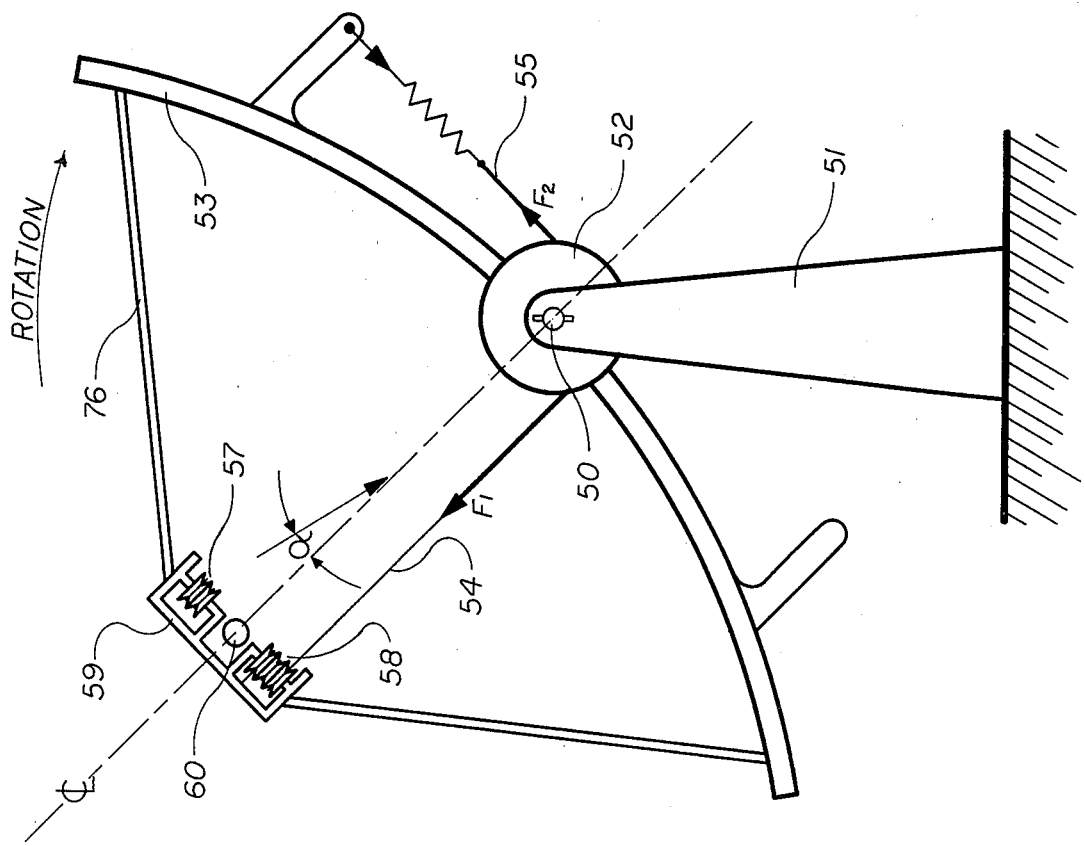
FIG. 12 is an end view of the motion compensated design.

FIG. 12 is a simplified view of the right end of the assemblies shown on FIGS. 10 and 11. All parts except the supporting pedestal, sprocket, and shaft are rigidly attached to each other and rotate around the shaft 50 as a unit. The shaft 50 is non-rotatable, keyed to the pedestal 51. The sprocket 52 is ratcheted in a conventional manner so that it is locked to the shaft against counter-clockwise rotation and is free wheeling in the clockwise direction. Both ends of the reflector 53 have this arrangement. A portion of the cable length 54 that contacts the sprocket during operation is of a chain or link belt configuration.

Assume the system is initially in equilibrium so that the spring force, $F_2$ in the cable 55 is the same as $F_1$ in cable 54, cable temperatures are everywhere the same, and the device is counter-balanced.

(1) Incident radiation commences making an angle α, with the principal axis of the reflector.

(2) The radiation at angle α causes the lower cable to heat relative to the upper cable, around upper cable pulleys 57, which remain closer to the initial temperature.

(3) Linear expansion of the lower cable relaxes its tension $F_1$ in the length to the left of the sprocket resulting in $F_2$ becoming greater than $F_1$.

(4) The unbalanced force rotates the reflector clockwise to reduce angle α.

(5) At α=ZERO the radiation no longer focuses on the cable which begins to cool and contract.

(6) Since all the parts have rotated together, there has been no relative change in positions. Hence, when the cable cools, it contracts to turn the sprocket in the opposite, clockwise direction and stretch the spring to its initial length. The reflector does not rotate back to its initial position because the sprocket is ratcheted so that it cannot torque the shaft when turning in the clockwise direction.

(7) As a result of the free movement of the sprocket in the clockwise direction, the initial conditions are restored, i.e., $$\alpha=0, \text{ and}$$

$$F_1=F_2$$

except that the reflector has been rotated to a new required position.

(8) A similar arrangement at the other end of the reflector has a sprocket which rotates freely when the sprocket at the first end is ratcheted. If the sun's elevation decreases so as to heat the upper cable, the sprocket will engage with the shaft so as to rotate the reflector downward to again focus on the collector.

Since at thermal equilibrium the cable tensions are equal and there is no change in cable length during rotation, the reflector and collector as a unit is free to rotate around the shaft. Externally applied forces, such as from gravity or wind, will cause the device to rotate with respect to the pedestal. Friction, latching, and/or damping devices are, therefore, necessary to prevent external forces from causing misalignment. Since large cable forces are available for overcoming static friction, large frictional forces can be used in conjunction with damping to accommodate loads expected during alignment motion.

Reference to FIGS. 13A-13C which depict the operation of a motion-compensated solar collector, will make clear the two possible non-equilibrium conditions.

CASE 1—Elevation Angle of Incident Solar Radiation Below Elevation Angle Of Reflector (FIG. 13A)

1. Upper cable heats, lower cable unheated and in equilibrium.
2. Tension in upper cable 56 between sprocket and collector decreases.
3. Sprocket locks on ratchet to prevent counterclockwise rotation; hence, spring tension force rotates reflector clockwise around shaft as indicated.

4. The ratchet on the sprocket on the left side permits downward reflector rotation.
5. Angle α is reduced to zero, the cable cools and equilibrium is re-established and maintained by a latch friction plate and/or dash pot damping device.

Case 2—Elevation Angle of Incident Solar Radiation Above Elevation Angle of Reflector (FIG. 13C)

1. Lower cable heats, upper cable unheated and in equilibrium.
2. Tension in lower cable between sprocket and collector decreases.
3. Sprocket locks on ratchet to prevent counterclockwise rotation; hence, spring tension force rotates reflector clockwise around shaft as indicated.
4. The ratchet on the right side permits upward reflector rotation.
5. Angle α is reduced to zero, the cable cools and equilibrium re-established and maintained by a latch, friction plate, and/or dash pot damping device.

In either case, during Step 4, the cable on the opposite end is in equilibrium; hence, the sprocket does not turn as the reflector rotates.

Figure 14:
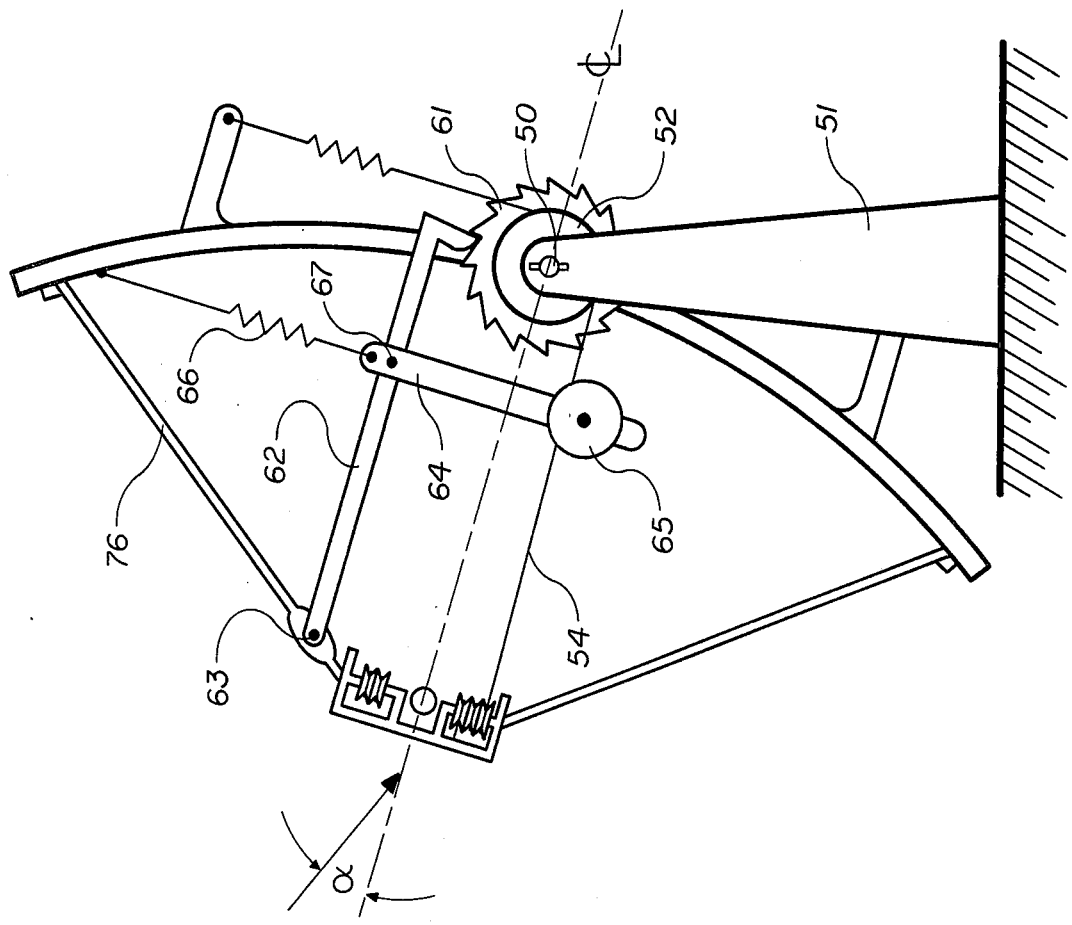
FIG. 14 is an end view of an automatic latching system for supporting wind and gravity loadings.

FIG. 14 depicts a modification of the motion compensated arrangement which provides a positive locking action for supporting externally applied forces such as caused by wind or gravity. The modification allows the reflector to rotate so as to maintain thermal equilibrium and proper alignment as described in connection with FIGS. 13A-13C. However, when in the equilibrium condition, latches automatically operate so that externally applied forces cannot rotate the reflector.

The latching system is illustrated by FIG. 14 which shows a ratchet wheel 61 that is keyed to shaft 50. Since the shaft is keyed to the pedestal 51 as previously described, the pedestal, shaft, and ratchet wheel are locked together and remain stationary when the collector 60 and reflector 53 rotate as a unit around the shaft. A latch 62 is attached to a support 76 by the pivoted connection 63. During the aligned equilibrium condition, pulley 65 is held down in the position shown on FIG. 14 by the tension in cable 54. Said tension force acts through link 64 to cause latch 62 to engage the stationary ratchet 61 so as to prevent clockwise rotation of the collector-reflector assembly. A similar latch at the other end of the assembly prevents it from rotating counterclockwise with reference to the view shown on FIG. 14.

To describe the action of the latch, it is assumed that the system is initially in the latched position at FIG. 14 and that the angle α between the principal axis of the reflector and the incident solar radiation is zero degrees. The following action sequence occurs following a change in α from zero to a value such as shown on FIG. 14.

(1) Lower cable 54 heats and relaxes.
(2) The loss in cable 54 tension decreases the downward force against spring 66, whereby latch 62 is spring-lifted relative to pivot 63 to disengage ratchet 61.
(3) Normal clockwise reflector rotation for achieving alignment as described above restores alignment (α=0).
(4) Cable 54 cools to restore its tension which pulls the pulley 65 and latch 62 downward around pivot 63 to re-engage ratchet 61 preventing further clockwise rotation by externally applied forces.

It is to be remembered here that the ratchet wheel 61 is fixed to the frame. It is not rotatable with sprocket 52.

If the elevation of the incident solar radiation is below the angle of elevation of the principal axis of the reflector, the latch at the other end of the assembly will operate similarly. With respect to the view shown on FIG. 14, the rotation for achieving alignment will be counterclockwise. Ratchet 61, FIG. 14, is designed to permit counterclockwise motion.

As a result of the latching actions at each end, the assembly of FIG. 14 will be locked to the shaft except when realignment of the principal axis of the reflector to incident solar rays is in progress.

FIG. 15 depicts in cross-section a Cassagranian type modification of the invention which eliminates the need for seals 67 shown on FIG. 10. The modification embodies a convex mirror 71 which intercepts converging direct radiation 27 from the concave reflector 53 to refocus the rays on a fixed collector pipe 60 located at the horizontal axis of the assembly. Cables 54 and 56 can be positioned below and above mirror 71 or alternately below and above collector pipe 60 as illustrated on FIG. 15. In either case, the mirror, reflector, and cable system rotate as a unit around the horizontal axis. Since the collector is at the horizontal axis, it is not necessary for it to rotate in order to intercept the refocused radiation from mirror 71. The ends of the collector may, therefore, be supported in a fixed manner in the support pedestals to eliminate the need for seals 67 required by rotating collectors such as shown on the FIG. 10 modification.

FIG. 16 illustrates another version of the Cassagranian type configuration which permits use of inexpensive reflecting surfaces having a poorer optical quality than those required by the arrangement shown on FIG. 15. Poor optical quality reflectors may produce wide focal bands and require collector pipe 60 to have a large diameter in order to intercept all the radiation. The heat loss and the initial material cost are drawbacks of large collectors.

Material cost and loss in efficiency can be avoided through use of concentrator 72 which has an acceptance angle sufficient for intercepting the wide band radiation from mirror 71 and concentrating it on the relatively small diameter collector pipe 60. The reflector 53, mirror 71, cables 54 and 56, and concentrator 72 rotate as a unit around the stationary collector 60 as previously described.

Still another modification of this invention relates to the use of a multiple number of inexpensive reflector collector assemblies without alignment means which are driven by a master reflector-collector assembly equipped with the novel self-aligning features of this invention. The modification is feasible because of the capability of the master assembly for producing large forces for alignment. For instance, one master assembly can provide forces in a 1,000–10,000 lb. range, or greater if necessary, for overcoming wind and friction forces imposed on it by the entire group. The modification is illustrated on FIG. 17 which depicts a master reflector 53 such as shown on FIG. 16, connected by linkages 70 to slave reflectors 53A, 53B, 53C, and 53D. The linkages cause the slave assemblies to duplicate the motions of the master assembly. Since collector pipes 60, 60A, 60B, 60C, inlet header 68, and outlet header 69 are stationary, the need for seals between the collectors and the inlet and outlet headers 68 and 69 is eliminated.

Figure 18:
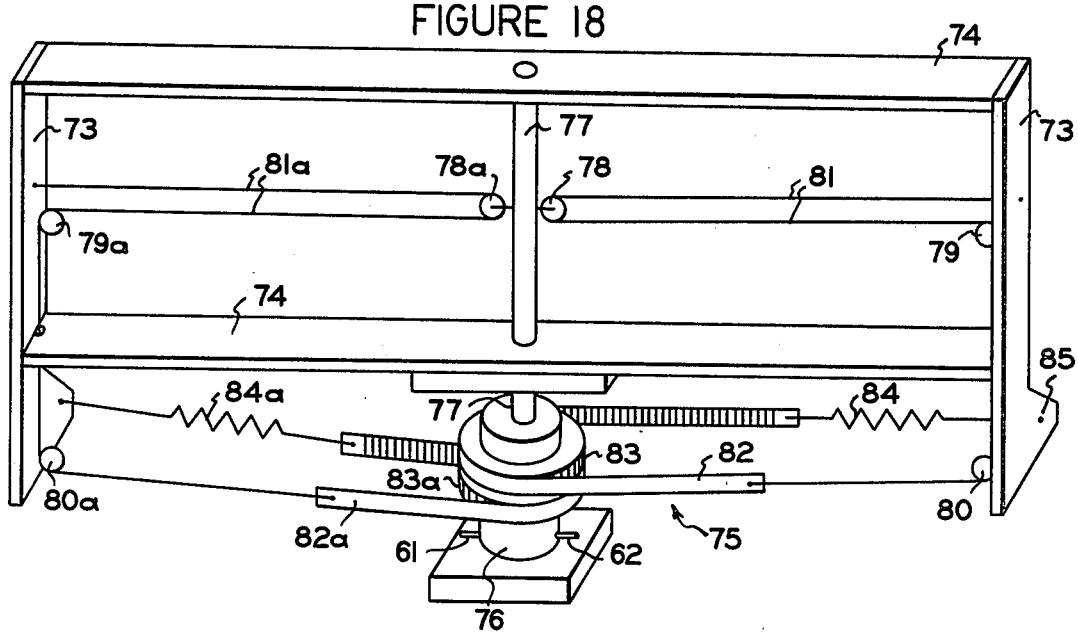
FIG. 18 is a three-dimensional view of the mechanical system used for rotating the reflector around the vertical axis for east-west alignment.

FIG. 18 illustrates another modification of the applicant's invention. This embodiment provides for aligning the reflector in both the horizontal and vertical planes. The preceding descriptions of the invention and its modifications relate to reflectors generally facing south and supported so as to sweep up and down in a vertical plane around a fixed horizontal axis. Since the ends of the horizontal axis were fixed in pedestals attached to ground foundations, the assembly could not rotate around its vertical axis so as to track the sun in its passage from the eastern to the western horizon. The purpose of this latest modification, now to be described, is to provide alignment in both the vertical and horizontal planes so that the projected full area of the reflector is normal to incident direct solar radiation at all times. To simplify the description, the means described above for rotating the reflector around its horizontal axis are not included in the Figures used to illustrate the modifications. However, it is to be understood that both the horizontal and vertical plane alignments are to be incorporated in this structure. FIG. 18 is a front view of a cable system used to produce the desired rotation around the vertical axis. End walls 73 are shown connected by rigid cross members 74 which are mounted on a pivoted support generally identified by the numeral 75. The stationary support member 76 includes bearings which support a hollow shaft 77 connected to frame cross member 74. Sprocket 83 on support housing 76 is ratcheted so that it rotates freely in the counterclockwise direction, but locks to the support housing when it attempts to turn in a clockwise direction, as viewed from above. It will be recognized that the system, in principle, is identical to the system previously described with FIG. 13 for providing rotation around the horizontal axis. Incident solar radiation from the left or right side of FIG. 18 will respectively cause either the left or right side cable system to heat. For instance, if the incident solar radiation is from the right side, cable 81 between its point of attachment to wall 73 and pulleys 78 and 79 will heat and expand linearly to decrease its resistance to the opposing force of spring 84. The unbalanced force then attempts to rotate sprocket 83 clockwise by means of link belt 82, however the ratchet locks sprocket 83 to the housing 76. Since one end of spring 84 is attached at 85 to a rearward extension of end wall 73 and the other end is connected to locked link belt 82, the spring force rotates the reflector-collector assembly in a counterclockwise direction to become normal to the incident radiation. When the incident radiation is from the left of FIG. 18, the cable system on the left side operates similarly except sprocket 83A is designed to lock to housing 76 when the sprocket attempts to turn counterclockwise. The assembly, therefore, rotates clockwise to restore horizontal alignment.

Figure 19:
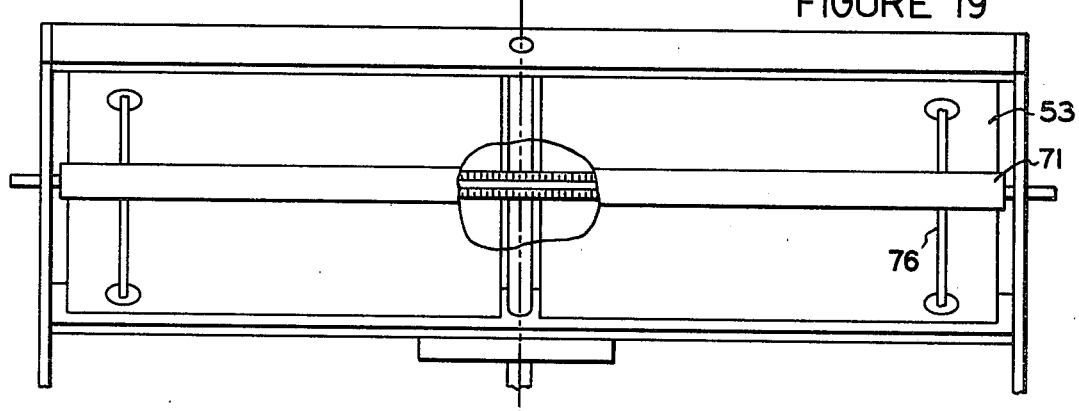
FIG. 19 is a three-dimensional view of the FIG. 18 device with a superimposed Cassagranian reflector system and concentrator.
Figure 20:
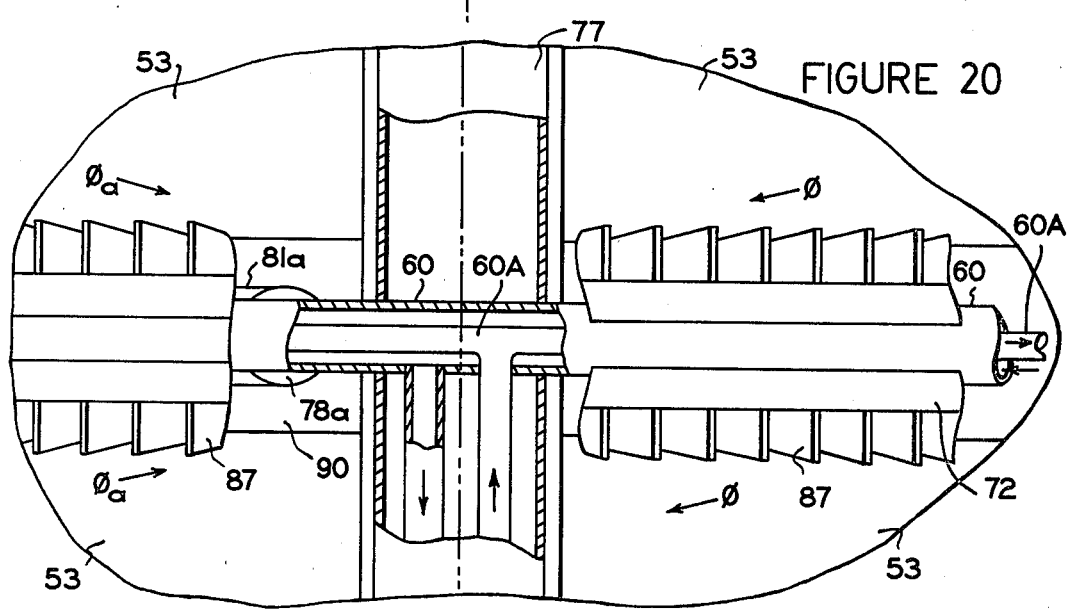
FIG. 20 is a detail of the central region of FIG. 19 showing the connections for heat transfer fluid.

An understanding of the novel means used to achieve preferential heating of the cables, as described above, can be had through examination of FIGS. 19, 20, and 21A. FIG. 19 is a view, in the direction of incident sun rays, of a Cassagranian type reflector-collector system assembled around the cable system of FIG. 18. FIG. 20 is an enlarged detail view of the broken away section outlined on FIG. 19 at the intersection of the horizontal and vertical axes of the reflector. FIG. 21A is an end view of FIG. 20 which shows the spatial relationship between the concentrator 72 and collector pipe 60.

Referring to FIG. 20, the stationary collector pipe 60 is shown under concentrator 72. A concentric inner pipe 60A provides a flow path for incoming coolant to the ends of collector pipe 60 where the flow reverses in direction and returns through the annular region between pipes 60 and 60A to the outlet pipe. Since the collector system is required to rotate around the vertical axis, the supporting housing 76 (FIG. 18) is provided with a seal which permits coolant to enter and exit from the rotating collector through stationary outlet and inlet pipes 61 and 62.

FIGS. 19 and 20 depict the means for preferentially heating either the left cable 81A or the right cable 81 shown on FIG. 18. Referring first to FIG. 20, optically black, non-reflecting plates 87 are shown attached to the outer sides of concentrator 72. The plates slant toward the vertical axis. It is important to note that the plate arrangement as shown on FIG. 20 will absorb all solar rays except from a preferred direction. For instance, the plates on the right side of the vertical axis allow rays, $\phi$, from the right side to pass between the plates, however the plates on the left side block and absorb all rays approaching from the right side. Conversely, only solar rays having a direction denoted by $\phi_a$ can pass between plates on the left side.

It is now necessary to consider FIG. 21, which is an end view of FIG. 20, in order to clearly explain how east-west alignment around the vertical axis is achieved. Concentrator 72 and plates 87 are attached to the reflector 53 by means of supports 88. Cables 54 and 56 which supply forces for rotating the reflector around its horizontal axis for vertical alignment as described earlier are shown in the alternate position as initially disclosed on FIG. 16. Thermal insulation 89 partially surrounds the collector pipe 60 and is attached to the outside of concentrator 72. The inside surface of the insulation is covered with material which is predominantly reflective of infra-red radiation from the collector. Similarly, the outside of the insulation is covered with material of low absorbtivity with respect to solar radiation. To the rear of the insulation are pulley 78 and cable 81. An additional pulley $78^1$ is included to provide for additional passes of cable 81 to ensure that a sufficient length of cable 81 will be heated at all positions of the reflector as it rotates on its horizontal axis around the pulley-cable assembly.

The entire assembly of pulleys 78 and $78^1$ and cable 81 are shown in cavity 90 in the reflector which extends the entire length of the reflector along its horizontal axis. It will be appreciated from the description of the assembly shown on FIG. 18 that collector pipes 60 and 60A, pulleys 78 and $78^1$, cable 81, and support 77 remain stationary when the reflector 53 and the attached concentrator assembly including insulation 89 and cables 54 and 56 rotate around the horizontal axis.

The alignment action is described through reference to FIGS. 16, 18, 20 and 21A. It is assumed that the reflector is initially misaligned so that the incident direct solar radiation is above the reflectors optical axis and from the right side as denoted by $\phi$ on FIG. 20. Because of the misalignment, the concentrated radiation reflected from the convex mirror 71 is directed toward the side of concentrator 72 as shown by $\phi$ on FIG. 21A. The radiation heats cable 54 and also passes between plates 87, as can be readily seen from an examination of FIG. 20, to enter the reflective cavity 90 to heat the four passes of cable 81 shown on FIG. 21A. It will be further appreciated that the blocking action of plates 87 shown on the left side of the vertical axis of FIG. 20 will prevent cable 81A of FIG. 18 from heating. Referring to the explanation of the operation of the cable system illustrated on FIG. 18, an increase in cable 81 temperature above the temperature of cable 81A will cause the assembly to rotate counterclockwise around the vertical axis. As a result of this action, the reflector will rotate to become aligned in an east-west direction so as to face the sun. Simultaneously, the heating of cable 54 will cause the reflector to tilt by rotation around its horizontal axis in accordance with the discussion of FIG. 16. As a result of the two simultaneous actions, the reflector will align itself to become normal to the incident solar flux $\phi$.

Figure 21C:
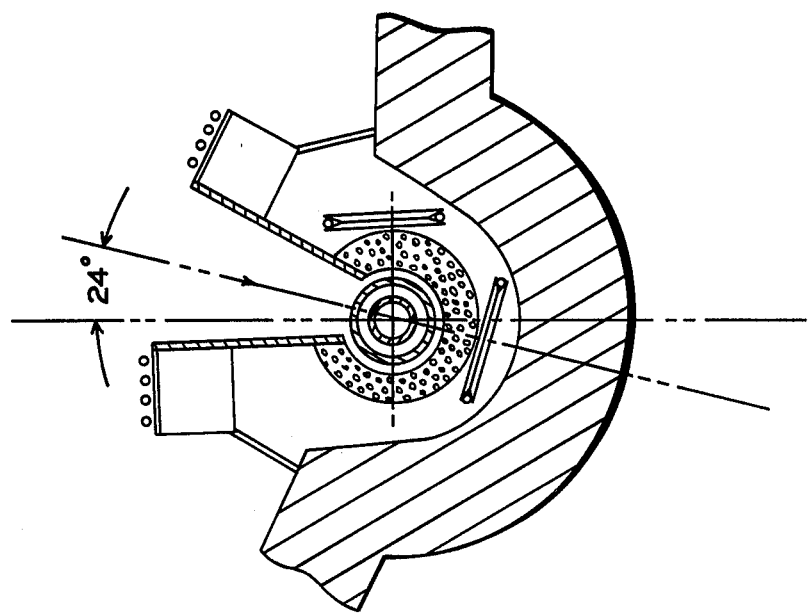
FIGS. 21A, 21B, and 21C illustrate the relative positions of the stationary and moving parts of the Cassagranian assembly through the entire range of vertical motion.
Figure 21B:
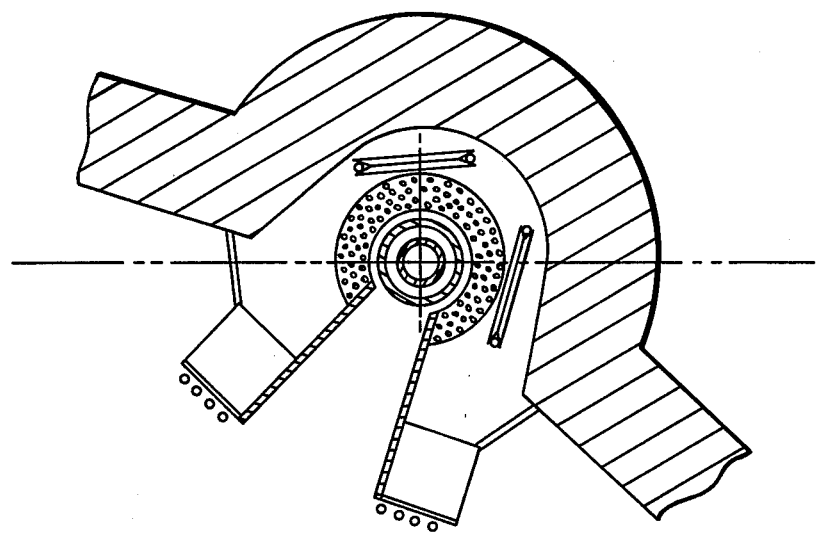
Figure 21A:
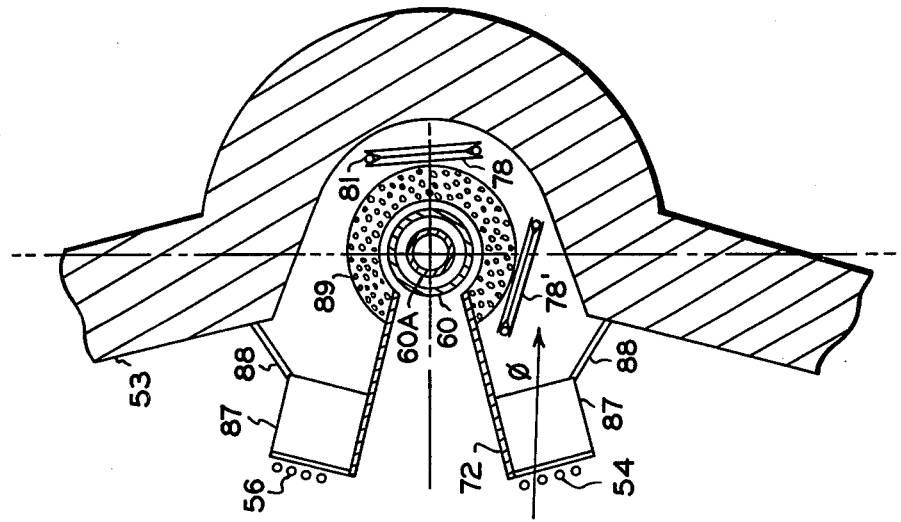

FIGS. 21A, 21B, and 21C illustrate the relative positions of the stationary and rotating parts through the entire 114 degree range of rotation around the horizontal axis.

It is to be understood that the latch mechanism shown on FIG. 13, the use of slave collectors revealed on FIG. 17, the modifications of these inventions shown on FIGS. 5, 12, 15, and 17, and combinations of the modifications, apply to this horizontal sweep aspect of the invention shown on FIGS. 19–21. Furthermore, other mechanical means may serve equally well as those used in this application for illustrating the basic principles of this invention.

The term "cable" is a convenient and descriptive word and is used in the claims for that reason. It is to be understood that the term "cable" in the claims is meant to embrace not only "cable" as the term is generally understood, but also wire, chain, strip, or any suitable elongated tensile member.

It will be apparent to those skilled in the art that various modifications and variations can be made in the solar collector of the invention without departing from the scope or spirit of the invention.

What is claimed is:

1. A self-aligning solar energy collection system, including:
    a solar reflector supported on a frame and disposed to pivot about horizontal pivot axis, said reflector defining an extended focal line for radiation incident normally to said reflector,
    a first tension cable connected at one of its ends to said frame and connected at its other end to said reflector above said pivot axis and extending parallel to and above said focal line, and
    a second tension cable connected at one of its ends to said frame and connected at its other end to said reflector below said pivot axis and extending parallel to and below said focal line,
    whereby said tension cables are in thermal equilibrium when said reflector is aligned with the sun, and in thermal disequilibrium when said reflector is out of alignment with the sun so that the consequent force imbalance in said cables effects a corrective rotation of said reflector about said pivot axis.

2. The system of claim 1, wherein said first and second cables are guided around means for providing an effective cable length with a self-produced work capability whereby enough force is produced to overcome wind, weight, friction and inertia loads.

3. The system of claim 1 further including a ratchet operatively connected between said reflector and said frame, and means responsive to radiant thermal energy to release and engage said ratchet at discrete intervals of rotation of said reflector to lock the system against rotation under the influence of extraneous forces.

4. The system of claim 1 further including means to lock the system, at discrete intervals of rotation, against rotation under the influence of extraneous forces.

5. A self-aligning solar energy collection system, including:
    an extended concave reflector to reflect and concentrate solar radiation on a collector disposed along the focal line of said reflector, said reflector being mounted on a support frame and disposed to pivot on a horizontal pivot axis,
    a first tension cable connected at its one end to said reflector above said horizontal pivot axis, extending parallel to and above said focal line, and connected at its other end to said support frame,
    a second tension cable connected at its one end to said reflector below said horizontal pivot axis, extending parallel to and below said focal line, and connected at its other end to said support frame, whereby, when said reflector is directed at the sun, solar radiation is focused on said focal line and said tension cables are in thermal equilibrium,
    and if said reflector is not directed at the sun, the consequent imbalance in heating of said first and second tension cables causes a relaxation of one of said cables relative to the other so that the other of said cables acts to move said reflector into alignment with the sun at which position said cables are in equilibrium.

6. A self-aligning solar energy collection system as defined in claim 5, in which said support frame is in turn mounted on a stationary base and disposed to pivot on a vertical pivot axis relative to said base, and further including:
    a third tension cable connected to said support frame, extending adjacent to said focal line, and exposed only to solar radiation incident from one side of said reflector, said third tension cable being operatively connected to said stationary base and coacting with said base to effect a sunward rotation of said support frame when the sun is to one side of normal to said reflector, and
    a fourth tension cable connected to said support frame, extending adjacent to said focal line, and exposed only to solar radiation incident from the other side of said reflector, said fourth tension cable being operatively connected to said stationary base and coacting with said base to effect a sunward rotation of said support frame when the sun is to the other side of normal to said reflector.

7. A self-aligning solar energy collector as defined in claim 6 in which said third cable is shielded from solar radiation incident from said other side of said reflector and said fourth cable is shielded from solar radiation incident from said one side of said reflector.

8. A self-aligning solar energy collection system, including:
    an extended concave reflector to reflect and concentrate solar radiation on a collector disposed along the focal line of said reflector, said reflector being mounted on a support frame and disposed to pivot on a horizontal pivot axis,
    a first tension cable connected at its one end to said reflector above said horizontal pivot axis, extending parallel to and above said focal line, and connected at its other end to said support frame,
    a second tension cable connected at its one end to said reflector below said horizontal pivot axis, extending parallel to and below said focal line, and connected at its other end to said support frame, whereby, when said reflector is directed at the sun, solar radiation is focused on said focal line and said tension cables are in thermal equilibrium, and if said reflector is not directed at the sun, the consequent imbalance in heating of said first and second tension cables causes a relaxation of one of said cables relative to the other so that the other of said cables acts to move said reflector into alignment with the sun at which position said cables are in equilibrium, said support frame being in turn mounted on a stationary base and disposed to pivot on a vertical pivot axis relative to said base, and further including:

a third tension cable connected to said support frame, extending adjacent to said focal line, and exposed only to solar radiation incident from one side of said reflector, said third tension cable being operatively connected to said stationary base and coacting with said base to effect a sunward rotation of said support frame when the sun is to one side of normal to said reflector, and a fourth tension cable connected to said support frame, extending adjacent to said focal line, and exposed only to solar radiation incident from the other side of said reflector, said fourth tension cable being operatively connected to said stationary base and coacting with said base to effect a sunward rotation of said support frame when the sun is to the other side of normal to said reflector.

9. A self-aligning solar energy collector as defined in claim 8 in which said third cable is shielded from solar radiation incident from said other side of said reflector and said fourth cable is schielded from solar radiation incident from said one side of said reflector.

* * * * *